W. E. GILROY.
FERTILIZER DISTRIBUTER.
APPLICATION FILED SEPT. 11, 1915.
1,230,069.
Patented June 12, 1917.
2 SHEETS—SHEET 1.
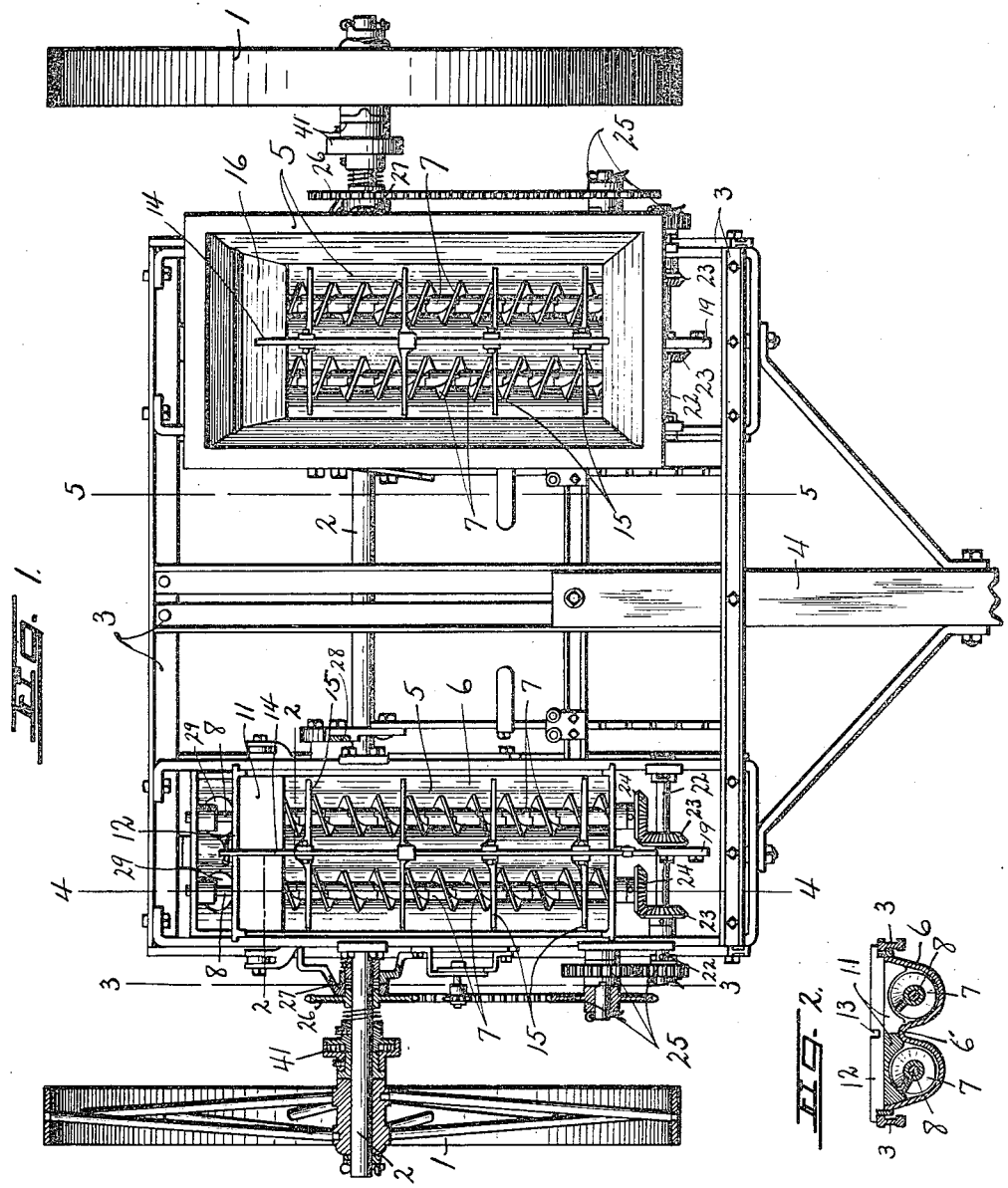
WITNESSES:
H. A. First.
E. A. Thompson.
INVENTOR
W. E. Gilroy
BY Howard P. Denton
ATTORNEY.

W. E. GILROY.
FERTILIZER DISTRIBUTER.
APPLICATION FILED SEPT. 11, 1915.
1,230,069.
Patented June 12, 1917.
2 SHEETS—SHEET 2.
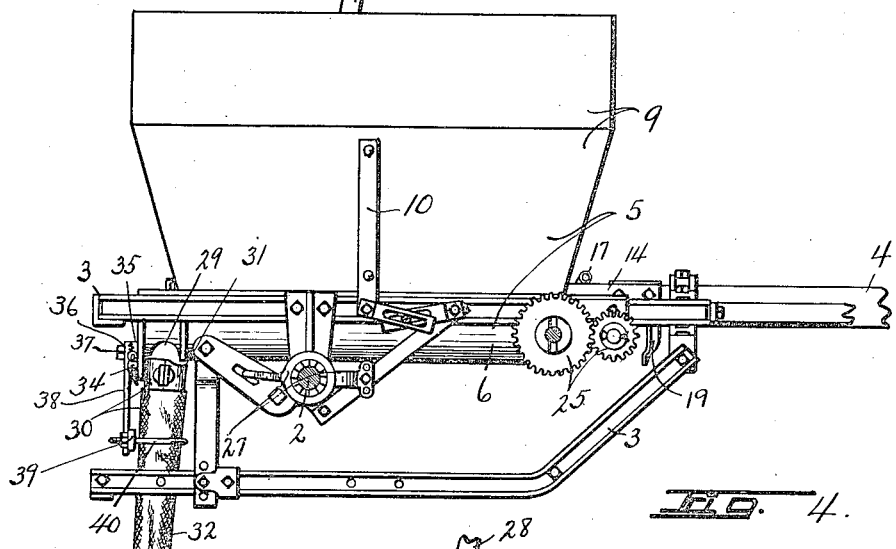
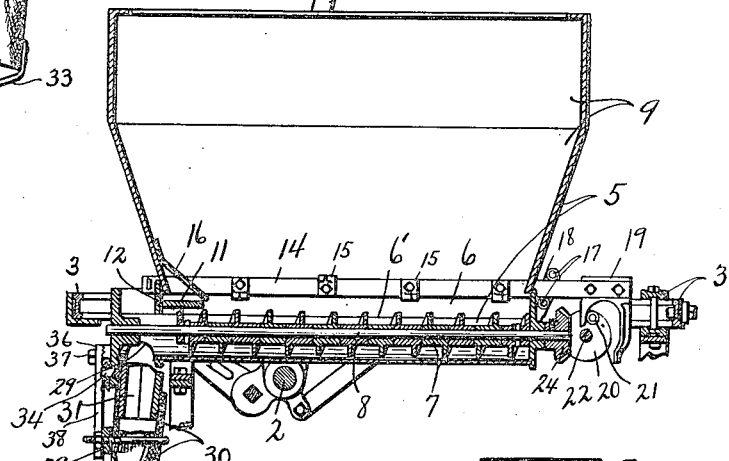
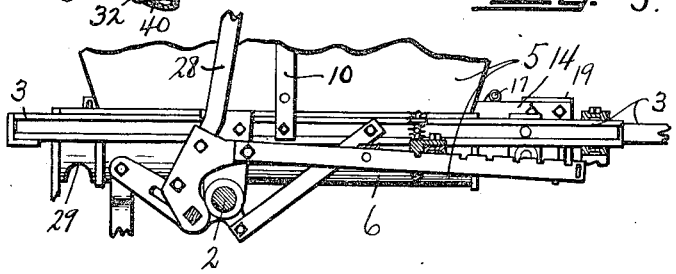

UNITED STATES PATENT OFFICE.

WILLIAM E. GILROY, OF UTICA, NEW YORK, ASSIGNOR TO EUREKA MOWER COMPANY, A CORPORATION OF NEW YORK.

FERTILIZER-DISTRIBUTER.

1,230,069. Specification of Letters Patent. Patented June 12, 1917.

Application filed September 11, 1915. Serial No. 50,231.

*To all whom it may concern:*

Be it known that I, WILLIAM E. GILROY, a citizen of the United States, and resident of Utica, in the county of Oneida, in the State of New York, have invented new and useful Improvements in Fertilizer-Distributers, of which the following, taken in connection with the accompanying drawings, is a full, clear, and exact description.

This invention relates to certain improvements in fertilizer distributers of the class adapted for depositing fertilizer in spaced rows along the ground.

The primary object of the invention is to provide an efficient machine, of comparatively simple construction, for distributing predetermined quantities of fertilizer in rows upon the ground, usually before, but susceptible of use after, the planting of the crop.

In accomplishing the above object, various features become of importance, first among which is the provision of a positive forced feed which may be depended upon for substantial uniformity of material distributed.

A further feature lies in the provision, in combination with a positive forced feed, of agitating means for leveling and breaking up the material in the hopper, further increasing the uniformity of distribution.

Another feature resides in the adjustment of the material-discharging tubes for varying the width of the rows of distribution.

Other objects and detail features of importance will appear from the following description, taken in connection with the accompanying drawings, in which—

Figure 1 is a top plan view of the machine.

Fig. 2 is a cross section on line 2—2, Fig. 1.

Fig. 3 is a cross section on line 3—3, Fig. 1.

Fig. 4 is a cross section on line 4—4, Fig. 1.

Fig. 5 is a cross section on line 5—5, Fig. 1.

The invention as shown comprises a pair of supporting wheels —1—, a shaft —2— upon which the wheels are mounted, and a suitable metallic framework —3— carried by the shaft, said framework including, in this instance, a suitable pole —4— adapted to carry draft devices, etc., to which the motive power may be connected.

The framework carries a pair of hoppers —5— of identical construction and spaced apart a distance upon the machine substantially equal to the normal desired distance between the rows of fertilizer to be deposited.

The hoppers, in this particular instance, are formed of two parts, a bottom portion —6— having an intermediate longitudinal rib —6'— to form a pair of trough-like channels for the reception of screw conveyers —7— formed preferably of malleable iron sections mounted upon shafts —8— journaled in opposite ends of the bottom portion —6—. Preferably, each section of the screw conveyer constitutes a spiral of one complete circumference of the shaft, and these sections may be interlocked, as shown.

The upper portion —9— of the hoppers is of somewhat less length than the bottom portion —6— and is fitted upon the portion —6— and secured to the upright bars —10— to form a receptacle above the screw conveyer for containing the fertilizer.

A suitable cross member —11— having circular grooves or channels in its under side adapted to conform substantially to the shape of the upper portion of the screw conveyer, rests within the member —6— and upon the rib —6'—, thereby constituting an outlet for the channels formed in the hopper substantially equal to the diameter of the screw conveyers to limit the amount of material passing therethrough.

The cross member —11— abuts at its rear side against a brace —12— having a slot —13— for slidably retaining the rear end of an agitator frame comprising a longitudinal bar —14— and cross bars —15— secured thereto and positioned within the hopper, the longitudinal bar —14— extending through the lower edge of the rear side of the hopper and through a deflecting plate —16— secured to the inner surface of the rear side of the hopper to deflect the material forwardly from the cross member —11—. The front end of the bar —14— extends through the front wall of the hopper and between suitable guide rollers —17— mounted upon an arm —18— extending upwardly from the frame.

Suitable means is provided for reciprocating the agitator when the machine is in operation, comprising a member —19— secured to the forward end of the bar —14— outside the hopper —5—, said member having a recess of such form so that the said member —19—, and thereby the bar —14—, will be moved back and forth by the rotation of disk —20— having a roller —21— eccentrically mounted thereon and movable against the walls of said recess. The disk —20— is mounted upon a shaft —22— journaled in the frame —3—.

The shaft —22— has operably mounted thereon a pair of beveled gears —23— meshing respectively with gears —24— mounted upon the front ends of shafts —8— so that rotation of the shaft —22— will result in rotation of the shafts —8—, and thereby the screw conveyers, and simultaneously a reciprocating movement of the agitator, within the hopper, comprising the bars —14— and —15—.

One end of the shaft —22— projects beyond the outer side of the frame —3— and is suitably connected by a train of gears —25— of any well known and desired form, with a gear —26— loosely mounted upon the shaft —2— and operably associated with said shaft by means of a well known clutch mechanism —27—, not herein necessary to further illustrate or describe, for causing the gear —26— to rotate in unison with, or allowing it to remain stationary with respect to, the shaft —2— as desired.

A suitable hand lever —28— is provided for operating the clutch to move it into and out of operating condition.

At the rear of the cross member —11— and of the screw conveyer —7—, the bottoms of the channels formed in the portion —6— are provided with openings —29— to allow the discharge of the fertilizer brought to this point by the screw conveyers, and for conveying the material to the ground suitable tubes —30— are provided, one for each screw conveyer, and adapted to discharge the material upon the ground. These tubes preferably comprise a metallic upper portion —31— and a lower flexible portion —32— of fabric or similar material, having removable spreaders —33— secured thereto adjacent the discharge end. As shown, the metallic upper portion —31— is provided with a lug —34— adapted to be passed through an opening in the member —7— at the rear of the openings —29—, and is secured in such position by any suitable means, as by a key or otherwise.

For the purpose of varying the width between the pairs of tubes for each unit or hopper of the machine, a pair of toothed washers —35— and —36— are provided, mounted upon a bolt —37— adjustable in the rear portion of the member —6—, one of said members, as —36—, provided with a depending arm —38— carrying a cross bar —39—, which bar in turn carries loops —40— surrounding the tubes —30—.

By loosening the bolt —37— and rotating the washer —36— in either direction, as desired, and tightening the bolt to hold the washers in any desired relative position, the respective pairs of tubes may be adjusted toward and from each other.

The wheels —1—, as described, are loosely mounted upon the shaft —2— and are so correlated with the shaft, by means of any suitable and well known mechanism, such as the ratchet and pawl mechanism —41—, that the shaft is rotated when the wheels move in one direction and may remain stationary when the wheels are reversed.

From the foregoing description, it will be apparent that either hopper may be used independently of the other, and that the amount of material distributed, depending upon the speed with which the screw conveyers travel, may be readily adjusted and regulated by varying the relative size of the gears in the train —25—.

Although I have shown and described one particular construction, form, arrangement and operation of the parts, I do not desire to limit myself to the same, as many changes may be made in form, arrangement, construction and details of operation without departing from the spirit of this invention as set forth in the appended claims.

What I claim is:—

1. A fertilizer distributer comprising a framework embodying supporting wheels, a hopper mounted on said framework, a screw conveyer within the hopper, a reciprocating agitator within the hopper above the screw conveyer, a rotary shaft, means driven from a wheel for rotating said shaft, a gear on the shaft, a gear upon the screw conveyer meshing with the gear upon the shaft for transferring rotary movement from the shaft to the screw conveyer and means mounted on and rotating with said shaft for reciprocating said agitator.

2. A fertilizer distributer comprising a framework embodying supporting wheels, a hopper mounted on said framework, a screw conveyer within the hopper, a reciprocating agitator within the hopper above the screw conveyer, a rotary shaft, means driven from a wheel for rotating said shaft, a gear on the shaft, a gear upon the screw conveyer meshing with the gear upon the shaft for transferring rotary movement from the shaft to the screw conveyer, a member mounted on said shaft and having an eccentric surface for engagement with said agitator to reciprocate the same upon rotation of said shaft.

3. A fertilizer distributer comprising a framework embodying supporting wheels, a hopper mounted on said framework, a screw conveyer within the hopper, a reciprocating agitator within the hopper above the screw conveyer, a rotary shaft, means driven from a wheel for rotating said shaft, a gear on the shaft, a gear upon the screw conveyer meshing with the gear upon the shaft for transferring rotary movement from the shaft to the screw conveyer, a member mounted on said shaft having an eccentric surface, said agitator provided with a pair of spaced projections separated from but adapted for alternate contact with said eccentric surface whereby the agitator is reciprocated upon rotation of said shaft.

4. A fertilizer distributer comprising a wheel-supported framework, a pair of spaced hoppers supported upon opposite sides of said framework, a rotary screw conveyer in each of said hoppers, said conveyers having their axes substantially perpendicular to the axis of rotation of said wheels, a pair of independent rotary shafts mounted adjacent the hopper and having their axes substantially parallel with the axis of rotation of the wheels, a gear mounted on each shaft, a gear on each screw conveyer meshing with the gear on the respective adjacent shaft, means actuated by respective wheels, and including a clutch mechanism for positively driving said shafts independently of each other either separately or in unison.

5. A fertilizer distributer comprising a wheel-supported framework, a pair of spaced hoppers supported upon opposite sides of said framework, a screw conveyer in each of said hoppers, separate connections between the adjacent wheel and its respective screw conveyer for transmitting movement from the wheel to the conveyer, and a clutch in each of said connections.

6. A fertilizer distributer comprising a wheel-supported framework, a pair of spaced hoppers supported upon opposite sides of said framework, said hoppers each formed with a pair of substantially parallel semi-cylindrical channels having their axes perpendicular to the axis of rotation of said wheels, a screw conveyer arranged in each channel and having an end projecting from the hoppers, a gear on each projecting end portion, an independent rotary shaft mounted on said framework adjacent each hopper, said shafts having their axes substantially parallel with the axis of rotation of the wheels, a pair of gears mounted on each shaft and meshing with the adjacent gears on said end portion of the screw conveyer, means actuated by respective wheels and including a clutch mechanism for positively driving said shafts independently of each other.

7. A fertilizer distributer comprising a framework embodying supporting wheels, a hopper mounted on said framework, a screw conveyer within the hopper, said screw conveyer having its axis of rotation substantially perpendicular to the axis of rotation of said wheels, a shaft at the forward end of said hopper rotatably mounted in said framework with its axis of rotation substantially parallel with the axis of rotation of said wheels, means for transmitting motion from a wheel to said shaft, co-acting gears mounted upon said screw conveyer and said shaft for transmitting movement from the shaft to said conveyer, an agitator in said hopper, and means carried by said shaft for reciprocating said agitator.

8. A fertilizer distributer comprising a wheel-supported framework, a hopper bottom, an upper box-like hopper portion of less longitudinal extent than the hopper bottom, a wall extending across the hopper bottom and adapted with said hopper bottom to form a passageway of substantially the same diameter as and for receiving the screw conveyer, said hopper bottom provided with a discharge opening at the rear of the upper hopper portion and adjacent the termination of said screw conveyer and tubes leading downwardly from said opening.

9. A fertilizer distributer comprising a wheel-supported framework, a hopper bottom having a channel extending substantially in the direction of movement of the distributer, an upper hopper portion of less extent than the hopper bottom, a wall extending across the hopper bottom adjacent the termination of the upper hopper section and adapted with said bottom portion to form a passageway of substantially the same diameter as and for receiving the screw conveyer, said bottom provided with a discharge opening at the rear of the upper hopper portion and adjacent the termination of said screw conveyer and tubes leading downwardly from said opening.

10. A fertilizer distributer comprising a wheel-supported framework, a hopper bottom having a channel extending substantially in the direction of movement of the distributer, an upper hopper portion of less extent than the hopper bottom, a wall extending across the hopper bottom adjacent the termination of the upper hopper section and adapted with said bottom portion to form a passageway of substantially the same diameter as and for receiving the screw conveyer, said bottom provided with a discharge opening adjacent the termination of said screw conveyer, and a plate positioned in the hopper and adapted to deflect the fertilizer away from the wall extending across the hopper bottom.

11. A fertilizer distributer comprising a wheel-supported framework, a pair of hoppers mounted on the framework and each provided with a pair of substantially semi-cylindrical channels having their axes substantially perpendicular to the axis of rotation of the wheels, an upper box-like hopper portion of less longitudinal extent than the hopper bottom, a pair of screw conveyers arranged in the channels of each hopper bottom, a wall extending across each hopper bottom at the termination of the upper box-like portion and forming with the hopper bottoms passage-ways of substantially the same diameter as the screw conveyers, discharge openings in the hopper bottoms at the rear of the wall, said screw conveyers having end portions projecting from the hoppers, gears mounted on said end portions, a separate rotary shaft for each hopper having its axis substantially parallel with the axis of rotation of the wheels, a pair of ends mounted on each shaft and meshing with the gears upon the end portions of the adjacent screw conveyers and means actuated from the wheels for driving said shafts.

12. A fertilizer distributer comprising a wheel-supported framework, a hopper bottom having a pair of substantially parallel channels spaced by an intermediate longitudinal rib, an upper hopper portion, a wall extending across the hopper bottom and adapted with said bottom to form passageways alined with and adapted to receive the screw conveyers, said screw conveyers having portions extending forwardly from the hopper bottom and provided with gears, a cross shaft mounted in said framework and having spaced gears mounted thereon for independent coaction with the gears mounted on said screw conveyer portions, and means for rotating said shaft.

13. A fertilizer distributer comprising a wheel-supported framework, a hopper bottom having a pair of substantially parallel channels spaced by an intermediate longitudinal rib, an upper hopper portion, a wall extending across the hopper bottom and adapted with said bottom to form passageways alined with and adapted to receive the screw conveyer, said bottom provided with discharge openings adjacent the termination of said screw conveyers for discharging the material conveyed thereby, an agitator adapted to move across the hopper bottom, and means rotating with said shaft for reciprocating the agitator.

14. A fertilizer distributer comprising a wheel-supported framework, a pair of hoppers mounted on the framework and each provided with a pair of substantially semi-cylindrical channels having their axes substantially perpendicular to the axis of rotation of the wheels, an upper box-like hopper portion of less longitudinal extent than the hopper bottom, a pair of screw conveyers arranged in the channel of each hopper bottom, a wall extending across each hopper bottom at the termination of the upper box-like portion and forming with the hopper bottoms passageways of substantially the same diameter as the screw conveyers, discharge openings in the hopper bottoms at the rear of the wall, said screw conveyers having end portions projecting from the hoppers, gears mounted on said end portions, a separate rotary shaft for each hopper having its axis substantially parallel with the axis of rotation of the wheels, a pair of ends mounted on each shaft and meshing with the gears upon the end portions of the adjacent screw conveyers, means actuated from the wheels for driving said shafts, an agitator in each hopper above the screw conveyers and means actuated by the rotation of said shafts for reciprocating said agitators.

In witness whereof I have hereunto set my hand this 4th day of September, 1915.

WILLIAM E. GILROY.

Witnesses:
G. W. SEYBOLD,
JEROME B. GERMAN.